(No Model.)   2 Sheets—Sheet 1.

G. W. WILKINS.
MACHINE FOR SAWING AND OUTGAGING MATERIAL FOR BARGES.

No. 259,737.   Patented June 20, 1882.

Witnesses
Hacker Reese
Jacob Reese

Inventor
George W. Wilkins
by
Frank M. Reese, Atty (No Model.) 2 Sheets—Sheet 2.
G. W. WILKINS.
MACHINE FOR SAWING AND OUTGAGING MATERIAL FOR BARGES.
No. 259,737. Patented June 20, 1882.
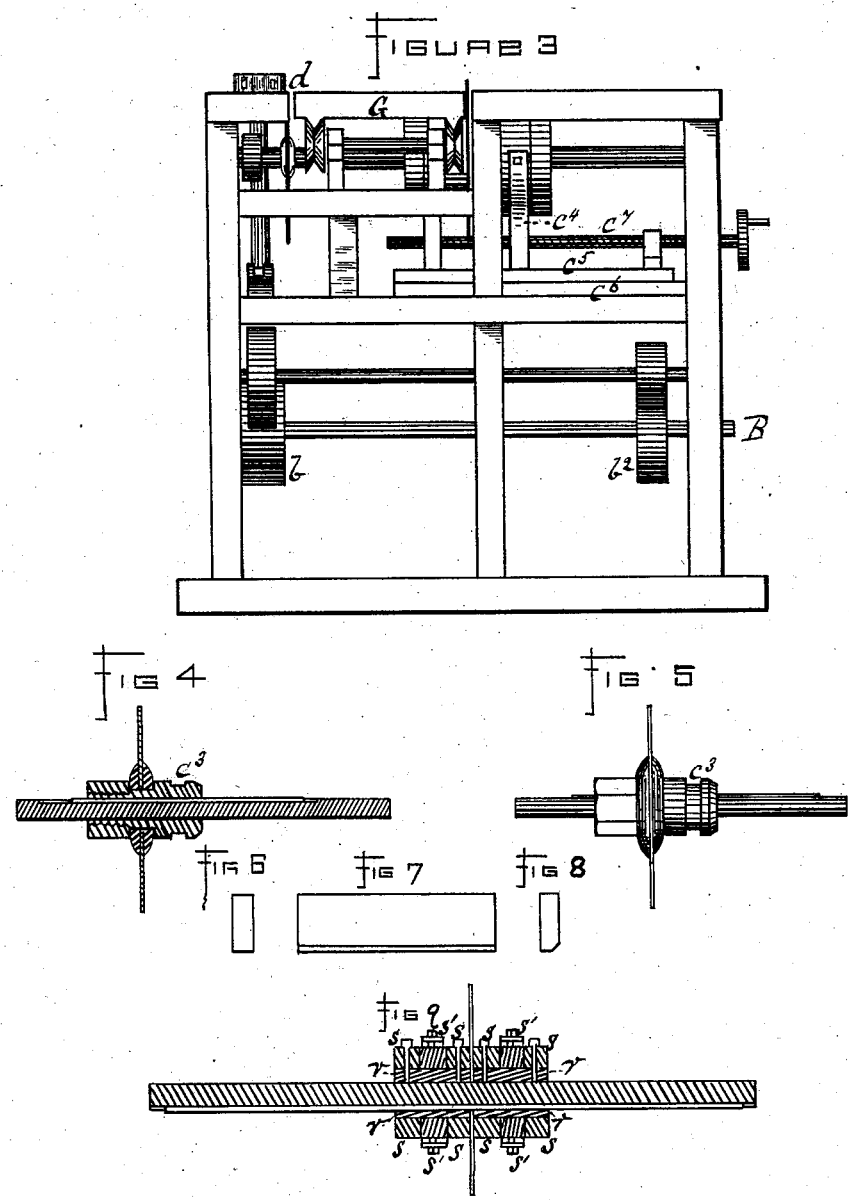

UNITED STATES PATENT OFFICE.

GEORGE W. WILKINS, OF BRATTONVILLE, PENNSYLVANIA.

MACHINE FOR SAWING AND OUTGAGING MATERIAL FOR BARGES.

SPECIFICATION forming part of Letters Patent No. 259,737, dated June 20, 1882.

Application filed June 28, 1881. (No model.)

*To all whom it may concern:*

Be it known that I, GEORGE W. WILKINS, a citizen of the United States, residing at Brattonville, in the county of Armstrong and State of Pennsylvania, have invented certain new and useful Improvements in Sawing and Outgaging Material for Barges; and I do hereby declare the following to be a full, clear, and exact description thereof, reference being had to the accompanying drawings, forming a part thereof, in which—

Figure 1:
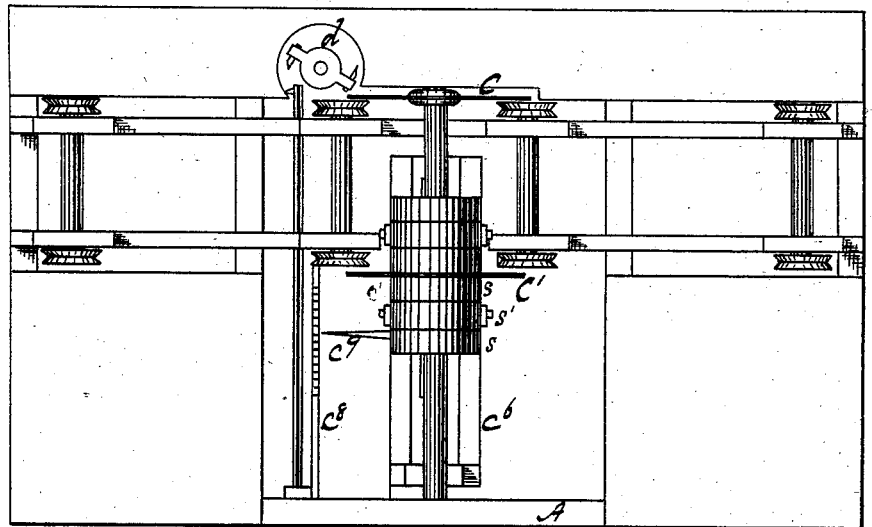
Figure 2:
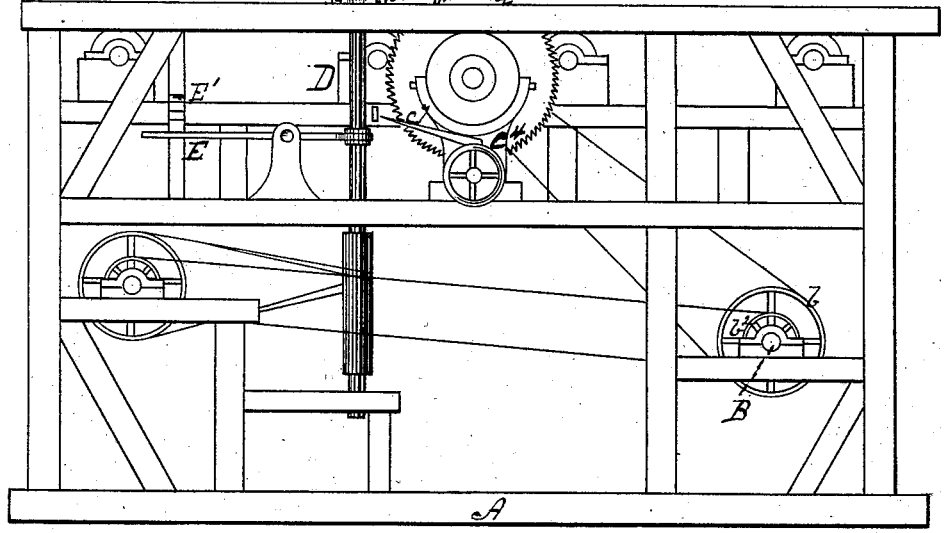

Figure 1 indicates a plan view of mechanism for sawing and outgaging material for the sides and bottoms of barges accurately and at a single operation. Fig. 2 indicates a side elevation of the same. Fig. 3 indicates an end elevation of the mechanism. Fig. 4 is a sectional view, and Fig. 5 an elevation showing a modification in the manner of securing the saws upon the mandrel. Fig. 6 indicates a cross-section of the plank immediately after sawing and before it is outgaged. Fig. 7 indicates the form of the finished plank, and Fig. 8 indicates an end view of the same. Fig. 9 is a sectional view of the laterally-adjustable saw, saw-hub, the saw arbor or spindle, and the spline on which the saw and hub have their lateral movements.

Like letters of reference indicate like parts wherever they occur.

In the manufacture of material for the sides and bottoms of barges, it is necessary that it should be of accurate and determined widths in order to break joint perfectly when applied to the frame of the barge. It is also necessary that a portion of one of the edges of the side of the plank should be scarfed, or, as the workmen term it, be "outgaged," so that when the planks are applied to the frames grooved spaces will exist at the sides of the plank to receive the oakum and facilitate the calking operation.

Heretofore, so far as I am aware, it has been customary to produce such barge and boat material by first squaring the log and then sawing it into plank of the required thickness. The planks produced in this way are not of uniform width and thickness, because the weight of the log causes it to bend or spring during the squaring operation, and because the saw is apt to lead out or in during the operation. It is necessary that the planks should be uniform in order to break joint evenly when applied to the frame of the boat or bottom of the barge, and therefore they are then planed true and outgaged by hand.

It will be readily understood that the operation I have just described involves considerable waste of material and requires considerable labor to reduce the raw material to the finished form desired. Now, the object of my invention is to obviate this waste as far as possible, to do away with the hand-labor, and to saw and outgage the plank accurately.

I will now describe my invention more fully, so that others skilled in the art to which it appertains may make and use the same.

In the drawings, A indicates the mill-frame, composed of strong timbers securely braced and bolted together.

B indicates the main driving-shaft, provided with a suitable driving-pulley, $b$, for the transmission of power by means of a belt to a small pulley, which is attached to the saw spindle or arbor.

C and C' indicate the saws, one of which, C, is fixed permanently, while the other, C', is mounted on a laterally-adjustable hub, $c'$. The hub is formed of two iron cylinders, $r$, grooved along their inner surface, so that they may be slipped on the spindle and moved over the spline until they press against the sides of the saw C'. Three iron rings, $s\ s'\ s$, are then slipped over each cylinder $r$, and the rings at the ends of the hub and those which bear against the sides of the saw are screwed or bolted fast to the inner cylinders $r$, so that the intermediate rings are left free to revolve on the cylinders $r$ of the hub. These intermediate rings are then bolted to the tops of the laterally-adjustable standards $c^4$, so that the hub and saw may be moved over the spline; or, instead of such construction, the saw C' may be mounted on the mandrel by means of the sliding flanges shown in Figs. 4 and 5. This sliding hub $c'$ is provided with a collar, which fits into annular grooves $c^3$ upon its surface, which collar is mounted on standards $c^4$, attached to a sliding base, $c^5$, which rests in a grooved surface formed by cross-timbers $c^6$ below the floor of the mill, and is adjusted laterally by means of an adjusting-screw, $c^7$, which is attached to the sliding base or standards and works in a head-block at the side of the mill.

$c^9$ indicates a finger or pointer attached to the movable base of the adjustable hub $c'$, and serves, in combination with a suitable gage, $c^3$, which may be attached to the frame opposite its point, to render the lateral adjustment of the saw C' rapid and accurate by indicating the distance at which the two saws are apart.

$b^2$ indicates a small supplemental driving-pulley, mounted on the main driving-shaft B, for the transmission of power to a vertical shaft or spindle, D, provided with a cutter-head and cutters, $d$. This cutter-head $d$ is adjustable vertically to scarf or outgage the edge of the plank to any degree desired by means of a suitable lever, E, which may be locked at any point desired by throwing its end into a locking bar or plate, E'.

G, Fig. 3, indicates the carriage on which the plank is held by a dog or dogs while it is subjected to the sawing or sawing and outgaging operation. This carriage is provided with V-rails, which rest upon the rollers of the way.

In the use of my improvement I first saw off a slab from the log. The log is then turned down on its cut side and sawed into planks of the required thickness, thus producing a number of planks of varying widths having a square and a wany edge. The planks are then taken from the slabbing-mill to the sawing and outgaging mill, the saws of which have been previously adjusted for the given width required—say fourteen inches. One of the planks is adjusted on the carriage so that its square edge is immediately in front of the fixed saw, allowing just sufficient material to form a kerf. The cutter-head is then adjusted to outgage to the degree desired, and the plank is secured by the dogs and moved forward and cut. In this operation the movable saw makes a clean cut through the length of the plank, while the fixed saw merely takes a slight kerf off of the square edge and trues it up, so that the cutter-head may produce a uniform scarf or outgage, and the plank may be of the same width throughout. This operation is then repeated, and the remainder of the planks are sawed and outgaged in a similar manner.

In conducting the operations the cutter-head $d$ and cutters should be adjusted to outgage two-thirds of the thickness of the edge of the plank when it is intended for the bottom of the boat, and to outgage about one-third when it is intended for the end or rake.

The advantages of my invention are: first, I am enabled to do away with considerable hand-labor; second, to produce a more uniform and accurate width; third, a saving of material is effected; and, fourth, the outgaging is better and more uniform than that produced by hand.

I am aware that edging and similar saws arranged upon a common spindle and adjustable to and from each other, together with pointers and scales for determining their adjustment, have heretofore been devised, and also that in tenoning-machines saws have been combined with revolving cutters so as to sever the lumber into lengths after the revolving cutters had operated to form the tenon thereon, and do not herein claim such combination or arrangement of saws and revolving cutters; but I am not aware that a rotating cutter has heretofore been so combined with an edging-saw as to follow the same in its operation upon the plank and scarf or bevel the edge of the plank which had first been trued by the operation of the edging-saw. Therefore, Having described my invention, what I claim, and desire to secure by Letters Patent, is—

In a machine for sawing and outgaging lumber, the combination of the fixed edging-saw C, for truing the edge of the plank, the rotating cutter $d$, arranged in line therewith and in rear thereof, for scarfing or outgaging the edge of the plank as it comes from the edging-saw, an adjustable edging-saw, C', for determining the width of the plank, together with suitable mechanism for actuating the saws and cutter, substantially as specified.

In testimony whereof I have hereunto set my hand.

GEORGE W. WILKINS.

Witnesses:
R. H. WHITTLESEY,
FRANK M. REESE.